(12) United States Patent
Eilenberger et al.

(10) Patent No.: US 11,371,932 B2
(45) Date of Patent: Jun. 28, 2022

(54) OPTICAL ASSEMBLY FOR THE HYPERSPECTRAL ILLUMINATION AND EVALUATION OF AN OBJECT

(71) Applicants: Fraunhofer-Gesellschaft Zur Foerderung Der Angewandten Forschung E.V., Munich (DE); Friedrich-Schiller-Universitaet, Jena (DE)

(72) Inventors: Falk Eilenberger, Jena (DE); Markus Graefe, Jena (DE); Frank Setzpfandt, Jena (DE); Thomas Pertsch, Hermsdorf (DE)

(73) Assignees: FRAUNHOFER-GESELLSCHAFT ZUR FOERDERUNG DER ANGEWANDTEN FORSCHUNG E.V., Munich (DE); FRIEDRICH-SCHILLER-UNIVERSITAET, Jena (DE)

( * ) Notice: Subject to any disclaimer, the term of this patent is extended or adjusted under 35 U.S.C. 154(b) by 31 days.

(21) Appl. No.: 17/253,698

(22) PCT Filed: Jun. 27, 2019

(86) PCT No.: PCT/EP2019/067221
§ 371 (c)(1),
(2) Date: Dec. 18, 2020

(87) PCT Pub. No.: WO2020/002532
PCT Pub. Date: Jan. 2, 2020

(65) Prior Publication Data
US 2021/0255096 A1    Aug. 19, 2021

(30) Foreign Application Priority Data

Jun. 29, 2018   (DE) .................... 10 2018 210 777.7

(51) Int. Cl.
*G01N 21/31* (2006.01)
*G02F 1/355* (2006.01)

(52) U.S. Cl.
CPC ..... *G01N 21/31* (2013.01); *G01N 2201/0635* (2013.01); *G01N 2201/0636* (2013.01); *G01N 2201/0638* (2013.01); *G02F 1/3551* (2013.01)

(58) Field of Classification Search
CPC ........... G01N 21/31; G01N 2201/0635; G01N 2201/0636; G01N 2201/0638; G02F 1/3551
See application file for complete search history.

(56) References Cited

U.S. PATENT DOCUMENTS

| 9,523,607 B2 | 12/2016 | Malcolm |
| 2015/0185077 A1* | 7/2015 | Malcolm ................. H01S 3/163 356/402 |

FOREIGN PATENT DOCUMENTS

DE    102014106974    11/2015

OTHER PUBLICATIONS

International Search Report.
(Continued)

*Primary Examiner* — Jamil Ahmed
(74) *Attorney, Agent, or Firm* — Jacobson Holman PLLC

(57) ABSTRACT

An optical assembly for the illumination and hyperspectral evaluation of an object, having a light source or an optical element at which a light source radiates, wherein the light source or the optical element is designed to divide pairs of unambiguously assignable photons into a first light beam and a second light beam so that the first light beam hits a first detector system and the second light beam is directed at an object and light radiation coming from the object is directed at an optical element which spectrally decomposes light radiation and, from the optical element spectrally decom- (Continued)

posing said light radiation, is directed at a second detector system. The first light beam can also be directed at a spectrally decomposing optical element and, from there, at a first detector system, and the light radiation coming from the object can be directed directly at the second detector system. The first detector system is designed to perform a spatially resolved sensing of the first light beam, and the first detector system or the second detector system is designed to perform a spectrally resolved sensing of the second light beam. The detector systems are connected to an electronic evaluation unit, by means of which the measurement signals captured with spatial and spectral resolution are associated. The first and second light beams are spectrally, spatially and temporally correlated.

9 Claims, 1 Drawing Sheet

(56) References Cited

OTHER PUBLICATIONS

German Examination Report.
Shengying Liu et al. Hyperspectral ghost imaging camera based on a flat-field grating. Optics Express, vol. 26, No. 13, Jun. 25, 2018, pp. 17705-17770. XP055619414.
Miles Padgett et al. Ghost Imaging, Optics and Photonics News, vol. 27, No. 10, Jan. 1, 2016, pp. 38-45.

* cited by examiner

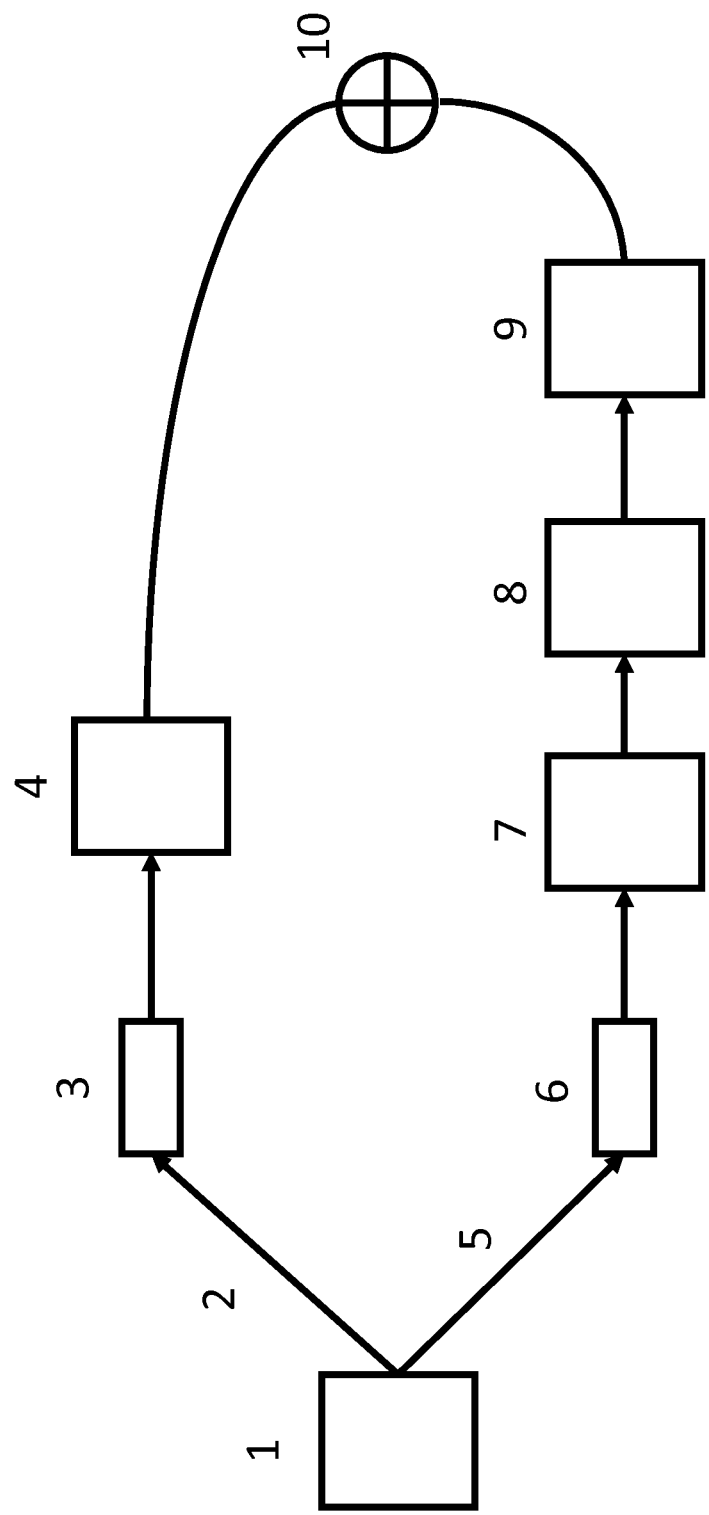

OPTICAL ASSEMBLY FOR THE HYPERSPECTRAL ILLUMINATION AND EVALUATION OF AN OBJECT

BACKGROUND OF THE INVENTION

The invention relates to an optical arrangement for the hyperspectral illumination and evaluation of an object. It can be used when hyperspectral information is intended to be determined with spatial resolution and can be measured by means of active illumination. This is necessary, for example, in the analysis of foodstuffs, chemical analysis, medical diagnostics, and in monitoring technology. For example, surface properties or chemical compositions of objects to be examined can thus be determined.

It is known, for example, to record three-dimensional information distributions sequentially in two-dimensional partial distributions. The sequencing can take place spatially or spectrally. These methods require either filters that select a spatial region of the object or a wavelength or a combination of both, or elements that allow tunable illumination only in one spatial region or with only one wavelength, or filters that correlate specific spatial regions with specific wavelengths. Filtering, in particular for high resolutions, reduces the efficiency when utilizing the light used. When using illumination with changing wavelengths (tuning), the complexity and costs are disadvantageous.

It is also known to use suitable optical elements to project a three-dimensional information distribution in a specific manner onto a two-dimensional detector. The entire information can then be reconstructed numerically from the measured individual image or a series of individual images from one imaging device or an arrangement of a plurality of imaging devices in which an experimental parameter is varied. The disadvantage in this case is that a high level of computing effort is required for the reconstruction.

What is known as computational ghost imaging can also be used for these purposes. Here, an individual light beam from a broadband light source in which different fluctuations are induced for different spectral bands before the light interacts with the sample is used. By analyzing the fluctuations after irradiating a sample, hyperspectral images are generated in a series of measurements recorded sequentially in time, using an individual detector system. The disadvantage of this method is the complex calibration of the construction or the necessary precise control or determination of the fluctuations introduced during the illumination of the respective sample.

SUMMARY OF THE INVENTION

It is therefore the object of the invention to make possible a determination of two-dimensionally spatially resolved spectral characteristics of the light that is transmitted through an object or reflected by an object or scattered by an object and in this case detection of an intrinsically three-dimensional information distribution, specifically the light intensity transmitted through the object or reflected or scattered by the object in dependence on two spatial coordinates and the wavelength, with the aid of one or more detectors that can detect only maximally two-dimensional information distributions.

This object is achieved according to the invention by an optical arrangement having the features of the claims. Advantageous embodiments and developments of the invention can be realized with features described in the dependent claims.

A light source or an optical element that is irradiated by a light source is present at the arrangement. The light source or the optical element is embodied here to split pairs of uniquely assignable photons into a first light beam and a second light beam such that the first light beam is incident on a first detector system and the second light beam is incident on an object. In this case, light radiation that is reflected or scattered by the object or transmitted through the object is directed onto an optical element that spectrally decomposes said light radiation and, from the optical element that spectrally decomposes said light radiation, onto a second detector system.

Alternatively, the first light beam may be directed onto an optical element that spectrally decomposes said light radiation and, from the optical element that spectrally decomposes said light radiation, onto a first detector system, and the light radiation that is reflected or scattered by the object or transmitted through the object may be directed directly onto the second detector system.

Depending on which detector system the spectrally decomposed light radiation is incident, said system should permit spectrally resolved detection of the spectrally decomposed light radiation of the respective light beam.

The first and the second light beam should be spectrally, spatially, and temporally correlated.

A light source with which pairs of uniquely assignable photons can be split into a first light beam and a second light beam can be implemented, for example, by means of spontaneous parametric down-conversion of light in specific optical media.

The first detector system is embodied to perform spatially resolved detection of the first light beam, and the second detector system is embodied to perform spectrally resolved detection of the second light beam that is spectrally decomposed and scattered or reflected by the object or transmitted through the object.

However, the first detector system can also be embodied for spectrally resolved detection and the second detector system for spatially resolved detection.

The first and the second detector system are connected to an electronic evaluation unit embodied to carry out an assignment of the photons of a pair that have been detected in a spatially and spectrally resolved manner and their measured properties.

The first and the second light beam are in each case spectrally, spatially, and temporally correlated in this case.

A light source that can form two spectrally broadband and spatially extended light beams that are subject to intensity fluctuations should therefore be used. The fluctuations or changes do not necessarily have to be correlated with one another in the different spectral components of in each case one of the two light beams. However, for each narrow spectral band of the first light beam, there should exist precisely one narrowband spectral band in the second light beam that has the same fluctuations. Furthermore, the fluctuations between two positions or angles of radiation in in each case one of the two extended light beams should be uncorrelated. For each position or each angle of radiation within the first light beam, there should be exactly one position or one angle of radiation in the second light beam at which the intensity has the same fluctuations/changes.

This can be achieved in particular with an optical element that can convert photons into entangled or correlated photon pairs through spontaneous nonlinear processes. This can be, for example, a non-linear crystal, through which a light beam emitted by a light source is directed.

The necessary intensity fluctuations can be achieved with a spontaneous conversion process. The basic properties of the conversion process can ensure the spatial and spectral correlations between the two photons of a pair. By separating the two photons of a pair, a first and second light beam with different beam orientations and/or positions can be obtained. The separation of the photon pairs for the first and the second light beam can take place by way of a suitable geometry of the non-linear crystal, which can ensure the emission of both photons for example in different directions. However, it can also be done using a beam splitter that splits the photons into the first and second light beams depending on their polarization or wavelength or simply statistically.

The first light beam with the properties described is directed onto a first detector system that is preferably two-dimensionally sufficiently spatially resolving. In particular, the fluctuations in the intensity of the first light beam at the different spatially different positions or in the different directions should here be detected. Said first detector system can detect the two-dimensional spatial intensity fluctuation distribution with sufficient accuracy and resolution. Said first detector system can in this case be, for example, a two-dimensional arrangement of single-photon detectors, a sufficiently sensitive and fast CCD sensor or CMOS sensor or a comparable device can be used. An individual detector that scans the region to be imaged in a suitable manner can also be used.

At least one imaging or beam-shaping optical element, in particular at least one optical lens or a reflective optical element, can be arranged in the beam path of the first light beam between the light source, or an optical element with which a separation of the photons of the photon pairs is able to be achieved, and the first detector system.

The second light beam is directed onto the respective object. At least one imaging or beam-shaping optical element, in particular at least one optical lens or a reflective optical element, can likewise be arranged in the beam path of the second light beam between the object and the light source or the optical element with which the photons of photon pairs are able to be separated. The light of the second light beam that is reflected, transmitted, or scattered by the object is directed onto an optical element with which the light radiation that is scattered or reflected by the object or transmitted through the object is decomposed into its spectral components. Different propagation directions for the different spectral components (wavelengths or narrow wavelength ranges in which, for example, wavelengths of ±10 nm around a central wavelength are maintained) can be obtained here. This spatial spectral decomposition of said light radiation can be achieved with a prism, an optical grating, or an element with a similar function, or an arrangement of such elements, or a combination with imaging elements or arrangements.

With the optional use of a suitable optical system, e.g. a cylindrical lens or a microlens array, the spectrally decomposed light radiation can then be directed onto a second spatially sufficiently resolving detector system, wherein the wavelengths of the spectrally decomposed light beams can be detected in a spatially resolved manner with individual detectors. The different spectral components of the light radiation that has been transmitted, scattered, or reflected by a position of the object can be measured at different spatial points of the second detector system. Spectral components of the same wavelength that have been reflected, scattered, or transmitted by different object positions can here be measured at the same spatial point, in particular the same detector of the second detector system. It should be possible to measure at the individual spatial points of the second detector system the temporal intensity fluctuations of the individual spectral components of the light radiation that is reflected or scattered by the respective object or transmitted through the object. An arrangement of single-photon detectors or a CCD sensor or CMOS sensor can again be used for the second detection system.

If an optical element is used for the spectral splitting of the second light beam that realizes the splitting in only one spatial dimension, a one-dimensional arrangement of detectors, for example a side-by-side arrangement, can be used when using an optical element that focuses in the spatial direction orthogonal to it. The optical element spectrally splitting the reflected, scattered, or transmitted light radiation and the second detector system can also be viewed and implemented as one overall system that provides spatially resolved spectral information.

However, the two detector systems should preferably be embodied as a row and column arrangement of individual detectors for two-dimensional detection of the measurement signals.

To carry out a measurement, the time profiles of intensity fluctuations measured by the two detector systems are compared or correlated with one another using an electronic, or another type of, evaluation unit. For this purpose, the electrical output signals of the detectors of the first and the second detector system can be processed in a suitable manner so that correlations of the measurement signals that are detected in a spatially and spectrally resolved manner can be evaluated. This can be done by using a computer, for example, which records the measurement signals individually and then correlates them by way of software. Alternatively, suitable hardware-related solutions, such as FPGA circuits, can also be used. This allows the measurement signal components, detected by the first detector system in a spatially resolved manner, of different spatial points to be assigned to the spectrally resolved measurement signal components of the second detector system in order to obtain the intensities of different spectral components that have been transmitted, reflected, or scattered by the object for these spatial points. If this assignment is carried out for all spatial points of the spatially resolving first detector system, a hyperspectral image can be obtained and evaluated.

The assignment of the individual spectral channels to specific wavelength ranges can take place by means of calibration measurements, which should be carried out for each spatial position to be measured before the respective object is measured.

A number of advantages can be achieved with the invention over the prior art for hyperspectral imaging and evaluation. All of the available light can be used in this case, as no spatial or spectral filtering is necessary. Furthermore, no moving parts are required. These properties result in performance advantages, since better resolution can be achieved with the same amount of light available. In other words, a lower intensity of the light required to illuminate an object can be selected, which is advantageous in particular in the case of light-sensitive objects, such as biological samples.

In addition, a solid construction can be made mechanically more stable and therefore offers increased measurement accuracy over a longer period of time. An improvement in the noise properties during the measurement can also be achieved.

DESCRIPTION OF THE DRAWING

The invention will be explained in greater detail by way of example below.

In this case:

FIG. 1 shows, in schematic form, an example of a possible implementation of an optical arrangement according to the invention.

In the example shown in FIG. 1, light radiation from a light source (not shown here) is directed through an optical element 1 and split into a first light beam 2 and a second light beam 5, each with a different direction. In this example, the optical element 1 is a non-linear crystal consisting of an optically non-linear material, such as beta-barium borate.

The optical element 1 is used to additionally separate photons of photon pairs for the first light beam 2 and the second light beam 5. The photons of a pair are here uniquely assigned to one another.

The first light beam 2 and the second light beam 5 are correlated here in their spatial, spectral, and temporal properties.

The first light beam 2 is incident on at least another optical element 3 with which the first light beam 2 is influenced in such a way that it is incident at least approximately on the entire sensitive surface of the first detector system 4. The first detector system 4 is formed with a row and column arrangement of individual detectors and embodied for the spatially resolved detection of the first light beam 2. The intensity of the light radiation of the first light beam 2 can be detected here in a spatially resolved manner with each individual detector.

The second light beam 5 is incident on at least one optical element 6 with which the second light beam 5 is influenced in such a way that it is incident at least approximately on the entire surface or on the surface to be examined of the respective object 7.

The light radiation that is reflected or scattered by the object 7 or transmitted through the object 7 is incident on a correspondingly arranged further optical element 8 with which a spectral decomposition of this light radiation into individual wavelengths or narrow wavelength ranges is achieved, and the light radiation of individual wavelengths or narrow wavelength ranges is incident on detectors of the second detector system 9 in a locally defined manner such that a spectrally resolved detection of the light radiation that is reflected, scattered or transmitted by the object 7 is able to be achieved.

The first detector system 4 and the second detector system 9 are connected to the electronic evaluation unit 10. The electronic evaluation unit can be used to carry out an evaluation as explained in the general part of the description.

The invention claimed is:

1. An optical arrangement for illuminating and hyperspectrally evaluating an object with a light source or an optical element that is irradiated by a light source, wherein
the light source or the optical element is embodied to split pairs of uniquely assignable photons into a first light beam and a second light beam in such a way that
the first light beam is incident on a first detector system and the second light beam is incident on an object and light radiation that is reflected or scattered by the object or transmitted through the object is directed onto a further optical element that spectrally decomposes light radiation and, from the further optical element that spectrally decomposes said light radiation, onto a second detector system,
or
the first light beam is directed onto at least one optical element that spectrally decomposes the light radiation and, from the at least one optical element that spectrally decomposes the light radiation, onto a first detector system, and the light radiation that is reflected or scattered by the object or transmitted through the object is directed directly onto the second detector system,
and
the first detector system is embodied to provide spatially resolved detection of the first light beam, and
the first detector system or the second detector system is embodied to perform spectrally resolved detection of the second light beam that is spectrally decomposed and scattered or reflected by the object or transmitted through the object, and
the first and the second detector systems are connected to an electronic evaluation unit that is embodied to carry out an assignment of the measurement signals detected in a spatially and spectrally resolved manner, and
the first and the second light beams are spectrally, spatially, and temporally correlated.

2. The arrangement as claimed in claim 1, wherein the optical element is a non-linear optical crystal with which photons can be converted into entangled or mutually correlated photon pairs, wherein the
splitting of the photons into the first and second light beams is effected directly by the non-linear optical crystal
or additionally by means of a beam splitter arranged in the beam path of the light beam emitted by the non-linear optical crystal.

3. The arrangement as claimed in claim 1, wherein the optical element or the beam splitter is embodied such that splitting into the first and second light beams is effected depending on the respective polarization or wavelength.

4. The arrangement as claimed in claim 1, wherein the further optical element that spectrally decomposes the light radiation is an optical grating or optical prism.

5. The arrangement as claimed in claim 1, wherein the further optical element is an integral part of the second detector system.

6. The arrangement as claimed in claim 1, wherein at least one imaging or beam-shaping optical element is arranged in the beam path of the first light beam and/or the second light beam.

7. The arrangement as claimed in claim 6, wherein the at least one imaging or beam-shaping optical element is an optical lens or an element reflecting the first and/or second light beam.

8. The arrangement as claimed in claim 1, wherein the first detector system is embodied for two-dimensionally spatially resolved detection of the photons in the first light beam.

9. The arrangement as claimed in claim 1, wherein spectrally decomposed light radiation that has been reflected or scattered by the object or transmitted through the object is directed onto the second detector system with an optical lens or a system of a plurality of lenses or a microlens array or an optical element reflecting the light radiation.

* * * * *